United States Patent [19]

Hayashida et al.

[11] Patent Number: 4,586,152

[45] Date of Patent: Apr. 29, 1986

[54] METHOD AND APPARATUS FOR COUNTING AN INFINITE LENGTH WITH A COUNTER OF FINITE LENGTH

[75] Inventors: Hiroshi Hayashida, Mito; Kunio Miyashita, Hitachi; Tadashi Takahashi, Hitachi; Shigeki Morinaga, Hitachi; Kosho Ishizaki, Hitachi, all of Japan

[73] Assignee: Hitachi, Ltd., Tokyo, Japan

[21] Appl. No.: 483,428

[22] Filed: Apr. 8, 1983

[30] Foreign Application Priority Data

Apr. 12, 1982 [JP] Japan ................................ 57-59596

[51] Int. Cl.⁴ .............................................. G06F 1/02
[52] U.S. Cl. .................................... 364/718; 364/167; 318/570
[58] Field of Search .................. 377/27; 364/718, 723, 364/167; 318/570, 573

[56] References Cited

U.S. PATENT DOCUMENTS

| | | | |
|---|---|---|---|
| 3,674,999 | 7/1972 | Kelling | 364/718 |
| 3,740,535 | 6/1973 | Szabo | 318/570 |
| 4,245,297 | 1/1981 | Bertram | 364/167 |
| 4,313,173 | 1/1982 | Candy et al. | 364/723 |

*Primary Examiner*—David H. Malzahn

*Attorney, Agent, or Firm*—Antonelli, Terry & Wands

[57] ABSTRACT

An endless counting apparatus comprises a first memory for storing a code of a first predetermined number of bits sufficient to represent the maximum value of each coded input expressed according to the binary notation, a second memory for storing an endless-making code of a second predetermined number of bits of higher order than and contiguous to the less and least significant bits stored in the first memory, and a control circuit for adding or subtracting the value of the coded input to or from the contents of the first and second memories depending on the input value to be counted and applying the result of addition or subtraction to the first and second memories. A method for endless counting by such an apparatus comprises clearing the most significant bit of the endless making code stored in the second memory when the code stored in the second memory has attained a value which causes an overflow due to a carry from the contents of the first memory if the carry occurs, and setting the most significant bit of the endless-making code stored in the second memory when the code stored in the second memory has attained a value which causes an underflow due to a borrow from the contents of the first memory if the borrow occurs.

10 Claims, 15 Drawing Figures

METHOD AND APPARATUS FOR COUNTING AN INFINITE LENGTH WITH A COUNTER OF FINITE LENGTH

This invention relates to a method and apparatus for endless counting, and more particularly to a method and apparatus of the kind above described which are preferably used for the positioning control of, for example, a form or paper feeder unit of a printer in which the form feeder unit is moved many times in such a manner that the amount of movement each time does not exceed a predetermined maximum.

For feeding a form using a form feeder unit of a printer or for moving or actuating a robot using an actuator unit, the unit is generally repeatedly driven or moved many times. In the case of, for example, the form feeder unit of the printer described above, a method has been most commonly employed in which the position at which the feeder unit stopped after each movement for form feed, that is, the present position of the feeder unit, is taken as a reference position which is used as the basis for computation of a relative distance from that position to the next desired position, and a command having a value indicative of this relative distance is applied for the positioning control of the feeder unit. In such a method, since the amount of movement of the feeder unit each time is less than the predetermined maximum, the capacity of a memory for storing the command value has merely been required to accommodate the number of bits corresponding to the predetermined maximum of the amount of movement of the feeder unit each time. However, in the control of the movement of the feeder unit, it has been difficult to stop the feeder unit always at the desired position without any error, and an error has inevitably appeared between the actual stopped position and the desired position determined by the command. Therefore, the above method, in which the position at which the feeder unit stopped after each movement for form feed is taken as a reference position, has been defective in that, when the feeder unit is moved many times with an accompanying error each time, accumulation of such an error leads to a considerable value. This is because, when movement of the feeder unit each time is accompanied by an error, the stopped position including such an error is taken as a new reference position on the basis of which a new command is issued to move the feeder unit to the next desired position. For example, even if the feeder unit could be stopped each time within the error range of $\pm 1$ F.C. (fine count) when the distance is expressed in terms of a count, movement of the feeder unit many times will result in an accumulated error of large value.

According to another method, the desired position to which a unit such as a form feeder unit is to be moved is expressed by an absolute position. That is, the theoretically desired or error-free present position plus a command value, or the present position which may include an error plus a command value selected to cancel such an error if such an error may be present, is used to determine the absolute desired position to which the feeder unit is to be moved under positioning control from the present position which may include an error. This method eliminates the problem of error accumulation since the positioning control of the feeder unit is effected each time it is moved to the desired position expressed by the absolute value. According to this method, however, an increase in the integrated value of the amount of movement requires a corresponding increase in the number of bits (capacity) of a memory storing the absolute position. Thus, when the number of bits of the memory is limited to some value, repeated movement of the feeder unit will result in an overflow of the memory contents, and the memory contents can no longer represent the true absolute position. Further, an underflow may occur when the feeder unit is commanded to move in the negative direction. In such a case too, the memory contents can not represent the true absolute position any more due to the limited number of bits of the memory. Consequently, when an overflow or an underflow occurs as a result of the arithmetic operation executed according to the absolute position command based on the present position plus the command value, the difference between the memory contents and the present position differs from the command value, and it becomes impossible to control the movement of the feeder unit on the basis of the present position and the desired position stored in the memory.

With a view to obviate the prior art problems pointed out above, it is a primary object of the present invention to provide a method for endless counting in which an endless-making code is added to the code of position information representing the absolute position of a movable body within a predetermined limited range, and, in order that an overflow or an underflow may not occur in the contents of a memory storing these codes, the MSB of the endless-making code is cleared or set so that the absolute position can always be expressed in an endless mode within the predetermined limited range, and also to provide an endless counting apparatus suitable for the practice of the endless counting method.

For the purpose of attainment of the positioning control of the movable body on the basis of an absolute position command, information of the present actual position of the movable body measured from, for example, the previous desired starting position of movement is merely required as the absolute position information of the present position, and the absolute position information of the present position of the movable body measured from the initial starting position of movement is unnecessary. Further, when the absolute value of the present position plus the command value is expected to cause an overflow or an underflow, by clearing or setting the most significant bit of the memory while holding the absolute position information required for the control, neither overflow nor underflow occurs in the memory, and the positioning control of the movable body can be accurately and reliably effected. For the necessity for storage of the absolute commanded position information in the memory, the memory employed in the present invention includes a first memory storing a position code composed of bits sufficient to represent the maximum value of movement of the movable body each time and a second memory storing an endless-making code composed of bits of higher order than and contiguous to the highest bit of the position code stored in the first memory. The procedure is as follows. The first and second memories store the absolute position information of the present position expressed to meet the range required for the purpose of control. When an overflow or an underflow is expected to occur by addition of the command value to the value stored in the first and second memories, that is, when a carry or a borrow from the first memory causes an overflow or an underflow of the contents of the second memory, the most significant bit of the code stored in the second memory is cleared or set. When the most significant bit of the code stored in the second memory is thus set or cleared, the bit so set must not change even when a borrow from the first memory occurs then, and the bit so cleared must not change even when a carry from the first memory occurs then. From this aspect, the number of bits of the code stored in the second memory is preferably three or more.

The first and second memories store the absolute position information of the desired absolute position to which the movable body is to be moved as commanded by the command, and a separate memory having the same number of bits as the total of those of the first and second memories stores the absolute position information of the actual present position. The movable body is moved according to the difference between the stored information representing the desired and present positions. In this case, the separate memory storing the absolute position information of the desired position is similarly divided into a first memory and a second memory, so that, when a carry or a borrow from the first memory occurs with the movement and an overflow or an underflow from the second memory is expected to occur as in the former case, the most significant bit of this second memory is similarly cleared or set. The number of bits of the first memory is sufficient to represent the maximum value of movement of the movable body in each time, and the most significant bit of the second memory, which is cleared or set when an overflow or an underflow is expected to occur, is selected to be a bit which does not change in spite of the next borrow or a carry from the first memory even if such borrow or carry occurs. Therefore, when clearing or setting of the most significant bit occurs, the correct distance to be moved by the movable body can be obtained as the difference between the stored position information representing the desired and present positions, while ignoring the most significant bit of the second memory. Therefore, the movable body is moved according to the difference between the stored information representing the desired and present positions while ignoring the most significant bit of the second memory even when it is cleared or set, so that the positioning control of the movable body moved to the absolute desired position can be reliably achieved without giving rise to an undesirable accumulation of errors. Further, memory overflow and underflow do not occur to ensure accurate positioning control.

The first and second memories in the present invention may be provided by dividing one word into corresponding bits in a single memory or may be provided as separate memories.

In accordance with one aspect of the present invention, there is provided a method for endless counting by an apparatus comprising a first memory for storing a code of a first predetermined number of bits sufficient to represent the maximum value of each coded input expressed according to the binary notation, a second memory for storing an endless-making code of a second predetermined number of bits of higher order than and contiguous to the less and least significant bits stored in the first memory, and means for adding or subtracting the value of the coded input to or from the contents of the first and second memories depending on the input value to be counted and applying the result of addition or subtraction to the first and second memories, the method comprising the steps of clearing the most significant bit of the endless-making code stored in the second memory when the code stored in the second memory has attained a value which causes an overflow due to a carry from the contents of the first memory, if the carry occurs, and setting the most significant bit of the endless-making code stored in the second memory when the code stored in the second memory has attained a value which causes an underflow due to a borrow from the contents of the first memory, if the borrow occurs.

In accordance with another aspect of the present invention, there is provided an apparatus for endless counting by addition and subtraction of data comprising a first memory for storing a code of a first predetermined number of bits sufficient to represent the maximum value of each coded input expressed according to the binary notation, a second memory for storing an endless-making code of a second predetermined number of bits of higher order than and contiguous to the less and least significant bits stored in the first memory, computing means for adding or subtracting the value of the coded input to or from the contents of the first and second memories depending on the input value to be counted and generating the result of computation, means for applying the result of computation generated from the computing means to the first and second memories, first circuit means for clearing the most significant bit of the endless-making code stored in the second memory by detecting the fact that the code stored in the second memory has attained a value which causes an overflow due to a carry from the contents of the first memory, if the carry occurs, and second circuit means for setting the most significant bit of the endless-making code stored in the second memory when the code stored in the second memory has attained a value which causes an underflow due to a borrow from the contents of the first memory if the borrow occurs.

The present invention provides various marked advantages which will be described presently.

An absolute position command is used to command movement of a movable body to the desired position expressed by an absolute position within the range required for the purpose of control, so that accurate positioning control can be effected without giving rise to an undesirable accumulation of errors resulting from many movements.

Since the position of the movable body can be represented by an endless code, the prior art problem such as the limitation of the moving distance due to the memory capacity being insufficient for the storage of the total amount of repeated movement of the movable body can be obviated, and the command commanding the movement of the movable body can be issued in an endless mode.

The sum of bits sufficient for representing the information corresponding to the maximum value of the amount of movement of the movable body in each time and those of the endless-making code is the total number of bits required for the endless representation of the absolute position within the range required for the purpose of control. Therefore, the number of required bits to be handled by the control circuit is small to attain the desired reduction in the scale and cost of the apparatus.

The present invention, which is applied to the positioning control of a motor by way of example, is widely universally applicable to other methods and apparatus for endless counting.

These and other objects, features and advantages of the present invention will be apparent from the following detailed description of preferred embodiments thereof taken in conjunction with the accompanying drawings, in which:

In FIG. 2, the symbols B and C designate a borrow and a carry respectively, and the symbol MSB designates the most significant bit of the data.

Figure 1:
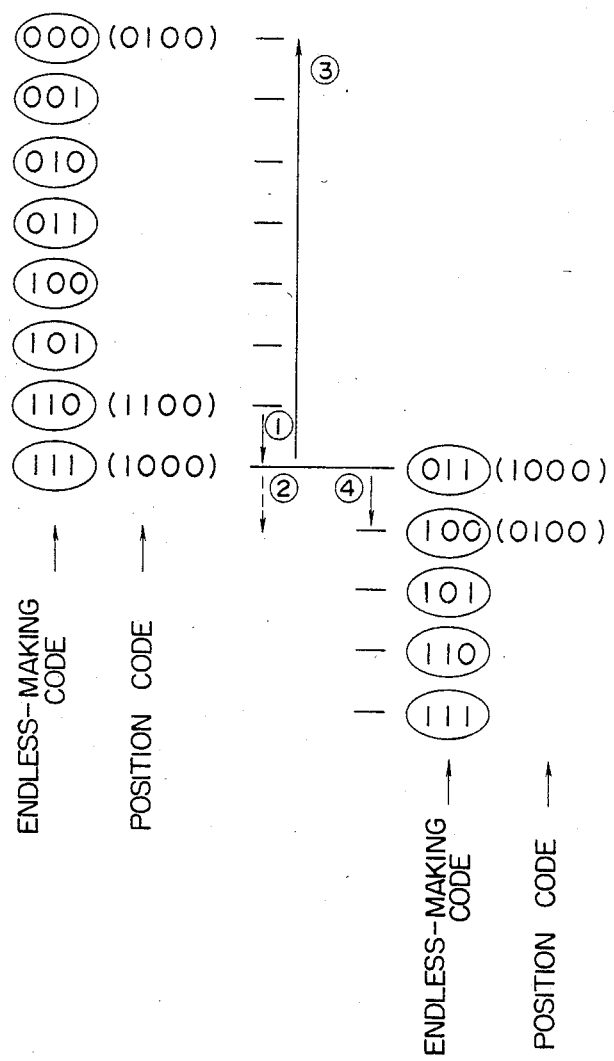
FIG. 1 illustrates how the counting method according to the present invention differs from a prior art method.

FIG. 1 is a partial illustration of the transition of binary data representative of desired positions to which a movable body is to be moved. The maximum value of the amount of movement of the movable body each time is expressed by 4 bits in FIG. 1, and the train of these 4 bits is called a position code herein. An endless-making code of 3 bits is provided as a higher-order code relative to the position code of 4 bits. When the position code is expressed by, for example, "1100" and the endless-making code is expressed by, for example, "110", the absolute position of the movable body is expressed by "1101100" as shown at 1.

Suppose that, after movement of the movable body to the absolute position 1, a new command is applied so as to move the movable body by the value of "1100" in the positive direction. Then, the absolute position 2 of the desired position is now expressed by "1101100"+"1100"="1111000".

Then, when the next command "1100" is applied while the movable body is located at the absolute position 2, its new absolute position is now expressed by "1111000"+"1100"="10000100". This means an increase from the 7 bits to the 8 bits. When the "1" in the MSB position is ignored since the memory capacity is 7 bits, the result is "0000100", and this means that the desired position moves back suddenly to the absolute position 3.

Such a problem can be avoided by making certain that, as soon as the endless-making code attains "111", the MSB of the endless-making code is cleared to provide "0111000" as shown at 4. Thus, when the next command "1100" is then applied, the absolute position of the new desired position is now expressed by "1000100", and no memory overflow occurs.

After the movable body is moved to the desired position 1, its actual present position information is substantially equal to the desired position information "1101100" and is thus expressed by "1101100" assuming that the movement is error-free for the sake of simplicity. The MSB of the endless-making code in the desired position information at the absolute position 4 remains the same regardless of occurrence of a borrow from the position code, and the value "111000" obtained by excluding the MSB "0" from "0111000" does not cause an underflow even when the amount of movement "1100" is subtracted therefrom. Therefore, "1100" is the difference between the desired position information "111000" obtained by excluding the MSB from the position information "0111000" at the absolute position 4 the present position information "101100" obtained by similarly excluding the MSB from the position information "1101100" at the absolute position 1, and this means that the amount of movement of the movable body is accurate as commanded. Therefore, the positioning control of the movable body can be accurately achieved by moving it according to the difference "1100" above described.

The same applies also to movement of the movable body in the negative direction. When, for example, a command for moving the movable body by "1100" in the negative direction from the present position "0011000" is issued, the desired position is now expressed by "0000100". In such a case, in order to avoid occurrence of an underflow due to the next movement in the negative direction, the MSB of the endless-making code is set as soon as the endless-making code attains the value "000", thereby changing the endless-making code to "100". In this case too, the difference "1100" between the desired position information and the present position information, from both of which the MSB is excluded, indicates the accurate amount of movement.

For ease of understanding, the endless-making code employed in the present invention will be specifically described with reference to FIG. 2.

Figure 2:
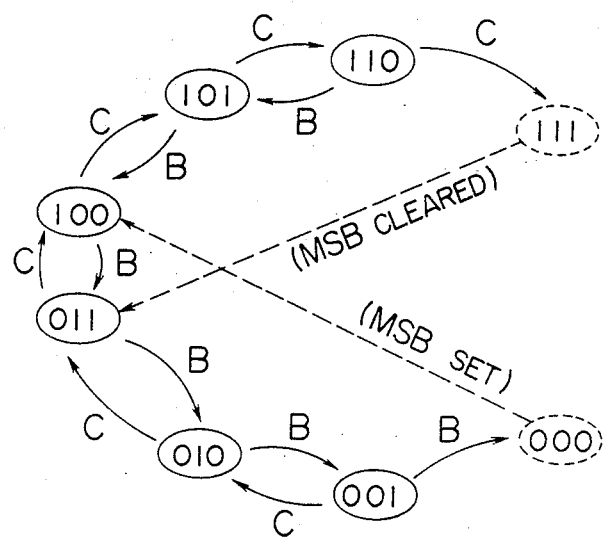
FIG. 2 illustrates the principle of the counting method according to the present invention.

When now the endless-making code is "110", application of a moving command results in occurrence of a carry C, and the endless-making code is now expressed by "111" as shown in FIG. 2. Clearing of the MSB of the endless-making code "111" provides the value "011" as shown by the broken line. Therefore, even when a carry C then occurs, "011" turns into "100" without causing occurrence of an overflow in the endless-making code.

On the other hand, when the endless-making code turns into, for example, "000" due to occurrence of a borrow B, setting of the MSB of "000" provides "100", so that an underflow does not similarly occur in the endless-making code. The principle of the present invention will be understood from the above description.

An embodiment of the endless counting method according to the present invention when applied to the positioning control of a movable body will now be described together with an apparatus suitable for the practice of this method. The embodiment is applied to a positioning control system comprising a control circuit including an encoder mounted on the shaft of a motor for encoding the angular rotation of the rotary shaft and a plurality of switching elements for driving the motor at a predetermined rotation speed.

Figure 3:
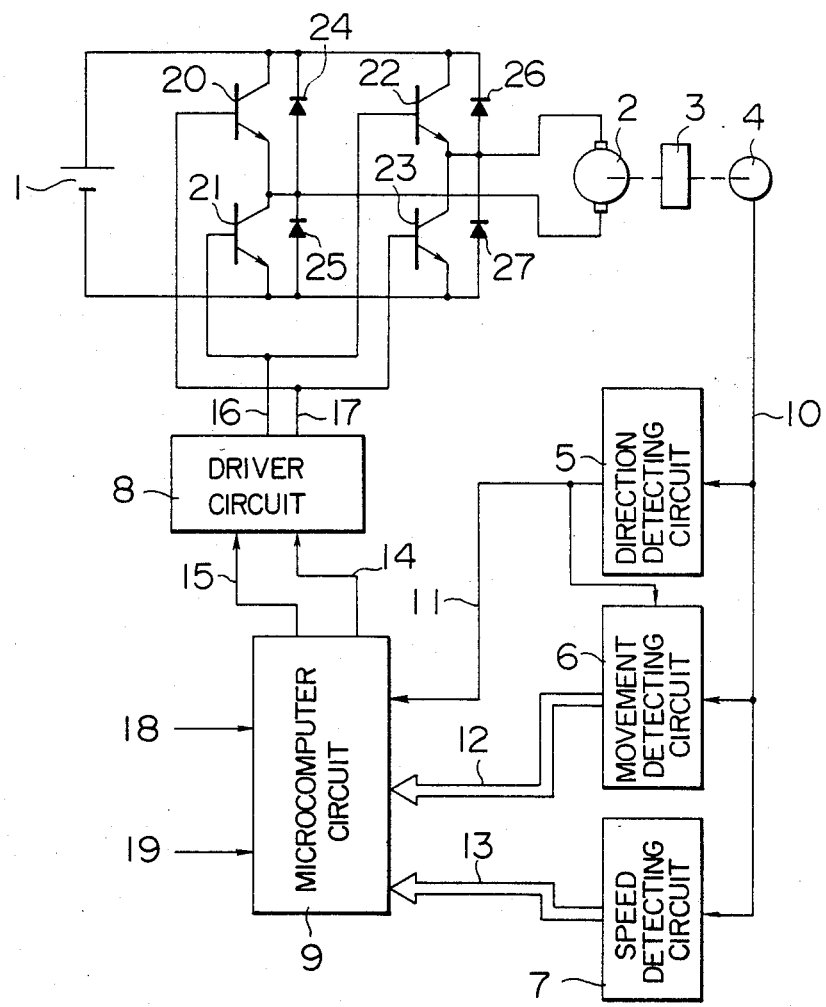
FIG. 3 is a block diagram showing the general structure of a control circuit used for the practice of positioning control according to the method of the present invention.

FIG. 3 shows one form of such a control circuit adapted for the positioning control of a motor.

Referring to FIG. 3, an H-type bridge circuit of transistors 20 to 23 and a bridge circuit of diodes 24 to 27 are connected across a DC power source 1. More precisely, the collectors of the transistors 20, 22 and the cathodes of the diodes 24, 26 are connected to the positive terminal of the power source 1, and the emitters of the transistors 21, 23 and the anodes of the diodes 25, 27 are connected to the negative terminal of the power source 1. The emitter of the transistor 20 is connected to one of the terminals of a motor 2 together with the collector of the transistor 21, the anode of the diode 24 and the cathode of the diode 25. The other terminal of the motor 2 is connected to the emitter of the transistor 22, the collector of the transistor 23, the anode of the diode 26 and the cathode of the diode 27.

The shaft of the motor 2 drives a load 3 and an encoder 4, and the rotation signal 10 appearing at the output of the encoder 4 is applied to a rotating direction detecting circuit 5, a movement detecting circuit 6 and a rotation speed detecting circuit 7. The rotation signal 10 generated from the encoder 4 includes two rotation signals 10a and 10b of rectangular waveform having different phases such that the phase of the signal 10a lags by 90° relative to the signal 10b when the motor 2 rotates in the normal direction and the phase of the signal 10a leads by 90° relative to the signal 10b when the motor 2 rotates in the reverse direction. Both of these two signals 10a and 10b are applied to the rotating direction detecting circuit 5 which detects the direction of rotation of the motor 2 depending on the relative phase lag or lead of the signals 10a and 10b. On the other hand, one of the rotation signals 10a and 10b is only applied to each of the movement detecting circuit 6 and the rotation speed detecting circuit 7.

The rotating direction signal 11 appearing from the rotating direction detecting circuit 5 is applied to both of a microcomputer circuit 9 and the movement detecting circuit 6. The movement signal 12 generated from the movement detecting circuit 6 and the rotation speed signal 13 generated from the rotation speed detecting circuit 7 are applied to the microcomputer circuit 9. In addition to these signals 11, 12 and 13, a stop position command signal 18 (commanding a predetermined amount of movement) and a maximum speed setting command signal 19 are also applied from an external circuit (not shown) to the microcomputer circuit 9. The microcomputer circuit 9 generates a duty signal 14 and a normal-reverse rotation signal 15 which are applied to a driver circuit 8. The driver circuit 8 generates a normal rotation output signal 16 and a reverse rotation output signal 17 which are connected to the bases of the transistors 21, 22 and to the bases of the transistors 20, 23, respectively.

The operation of the control circuit having such a structure will now be described.

In response to the application of the stop position command signal 18 and the maximum speed setting command signal 19 together with the rotating direction signal 11 indicative of the direction of rotation of the motor 2, the speed signal 13 indicative of the rotation speed of the motor 2 and the movement signal 12 indicative of the amount of movement of the motor 2, the microcomputer circuit 9 makes necessary arithmetic and logic operations on the input signals to apply to the driver circuit 8 the duty signal 14 for determining the voltage applied to the motor 2 and the normal-reverse rotation signal 15 for determining the direction of rotation of the motor 2. When the determined direction of rotation of the motor 2 is the normal direction, the driver circuit 8 generates its normal rotation output signal 16 to turn on the transistors 21 and 22 according to the duty factor determined by the duty signal 14 thereby imparting a rotating force to the motor 2.

In the initial stage of motor operation, the present angular position of the motor 2 provided by the motor movement signal 12 applied to the microcomputer circuit 9 is distant from the desired angular position commanded by the stop position command signal 18. Therefore, the duty factor of the voltage applied to the motor 2 is increased to accelerate the motor 2. The increasing rotation speed of the motor 2 is so controlled that the rotation speed indicated by the speed signal 13 does not exceed the maximum speed setting indicated by the maximum speed setting command signal 19. When, with the rotation of the motor 2, the difference between the present angular position and the desired angular position becomes less than a predetermined value, the reverse rotation output signal 17 is applied from the driver circuit 8 to the transistors 20 and 23 so that the motor 2 can be stopped at the desired angular position. The transistors 20 and 23 are turned on in response to the signal 17 thereby applying the DC braking force to the motor 2 so as to quickly and stably stop the motor 2 at the desired angular position.

The structure of the individual blocks shown in FIG. 3 will be described in further detail.

Figure 4:
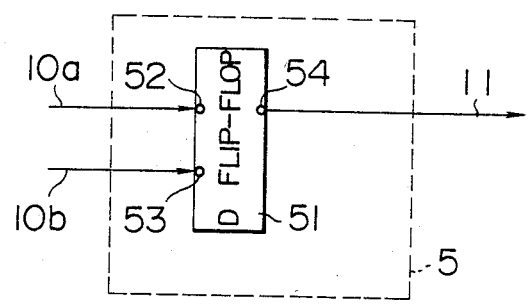
FIG. 4 is a circuit diagram showing the structure of the rotating direction detecting circuit shown in FIG. 3.
Figure 5:
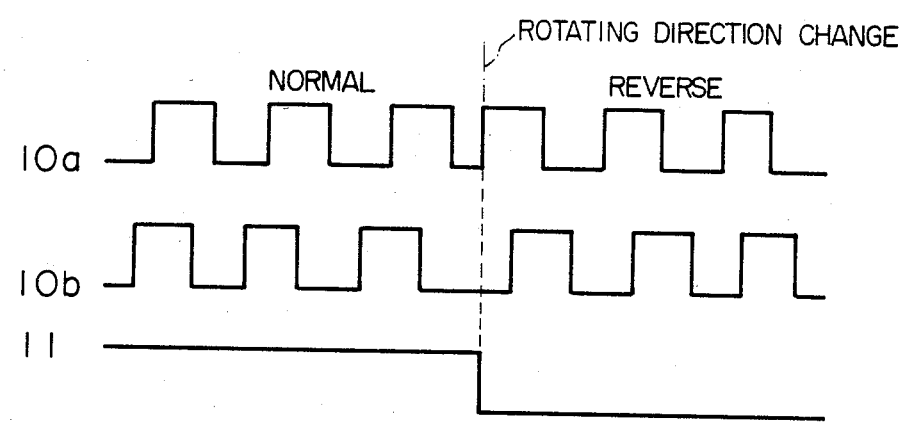
FIG. 5 is a timing chart showing the operation of the circuit shown in FIG. 4.

FIG. 4 shows the structure of one form of the rotating direction detecting circuit 5. Referring to FIG. 4, the reference numeral 51 designates a D-type flip-flop. The two-phase rotation signals 10a and 10b generated from the encoder 4 are applied to the clock input terminal 52 and D input terminal 53 respectively of the D-type flip-flop 51. The flip-flop 51 operates in response to the rising edge of the signal 10a applied to its clock input terminal 52. When the motor 2 rotates in the normal direction, the phase of the rotation signal 10b generated from the encoder 4 leads that of the rotation signal 10a as shown in FIG. 5. Therefore, the signal 10b applied to the D input terminal 53 has a high level at the rise time of the signal 10a which is the clock signal applied to the clock input terminal 52, and the output signal 11 appearing from the output terminal 54 of the flip-flop 51 has a high level. On the other hand, when the motor 2 rotates in the reverse direction to reverse the direction of rotation of the encoder 4, the phase of the signal 10b lags that of the signal 10a, and the signal 10b applied to the D input terminal 53 is always in its low level at the rise time of the signal 10a applied to the clock input terminal 52. In this latter case, therefore, the output signal 11 from the flip-flop 51 has a low level. In the manner above described, the direction of rotation of the motor 2 can be detected by the rotating direction detecting circuit 5.

Figure 6:
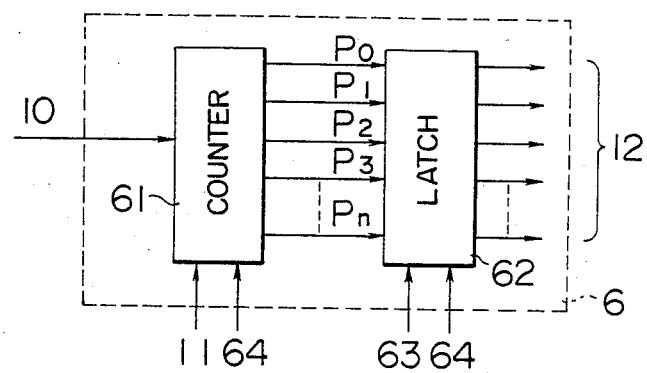
FIG. 6 is a circuit diagram showing the structure of the movement detecting circuit shown in FIG. 3.

FIG. 6 shows in detail the structure of one form of the movement detecting circuit 6. Referring to FIG. 6, the circuit 6 includes an up-down counter 61 and a latch circuit 62. The rotation signal 10 (one of the signals 10a and 10b) is applied as a clock input to the up-down counter 61, and the rotating direction signal 11 is applied as an up-down control input to the up-down counter 61. Counter outputs $P_o$ to $P_n$ are connected to corresponding inputs of the latch circuit 62 so that the output signal from the latch circuit 62 appears as the movement signal 12. A stroke signal 63 is applied to the stroke terminal of the latch circuit 62 for the purpose of latching. A reset signal 64 is applied to both of the up-down counter 61 and the latch circuit 62 for the purpose of resetting.

Figure 7:
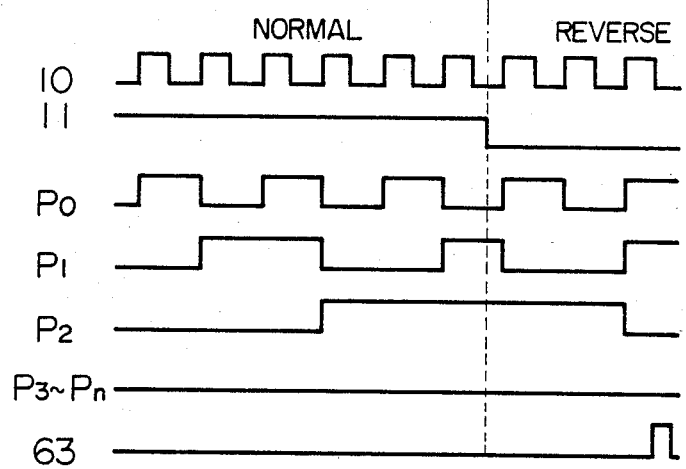
FIG. 7 is a timing chart showing the operation of the circuit shown in FIG. 6.

FIG. 7 is a timing chart illustrating the operation of the circuit 6. The up-down counter 62 counts the clock pulses of the rotation signal 10 applied to its clock input terminal. When the motor 2 rotates in the normal direction and the rotating direction signal 11 is in its high level, the up-down counter 61 functions as an up counter making its count-up operation, and the output from the up-down counter 61 changes as shown by Po to Pn in FIG. 7. On the other hand, when the direction of rotation of the motor 2 is reversed, the rotating direction signal 11 turns into its low level, and the up-down counter 61 starts its count-down operation. The stroke signal 63 is applied to the latch circuit 62 at a predetermined time interval to latch the count of the up-down counter 61 so as to update the movement signal 12. At the time at which a new position command signal 18 is applied to the microcomputer circuit 9, both of the up-down counter 61 and the latch circuit 62 are reset by the reset signal 64.

Figure 8:
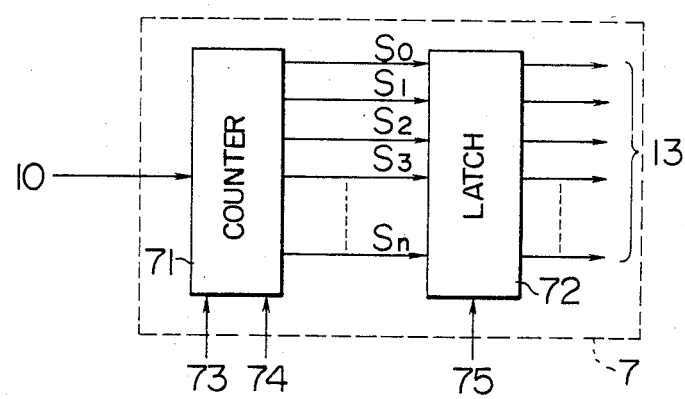
FIG. 8 is a circuit diagram showing the structure of the rotation speed detecting circuit shown in FIG. 3.

FIG. 8 shows the structure of one form of the speed detecting circuit 7. Referring to FIG. 8, the circuit 7 includes a counter 71 and a latch circuit 72. The rotation signal 10 (the signal 10a or 10b) is applied from the encoder 4 as a clock input to the counter 71. An enable signal 73 is applied at a predetermined time interval to the enable terminal of the counter 71, and a reset signal 74 is applied to the reset terminal of the counter 71. Counter outputs So to Sn are connected to corresponding inputs of the latch circuit 72 so that the output signal from the latch circuit 72 appears as the rotation speed signal 13. A stroke signal 75 is applied to the latch circuit 72.

Figure 9:
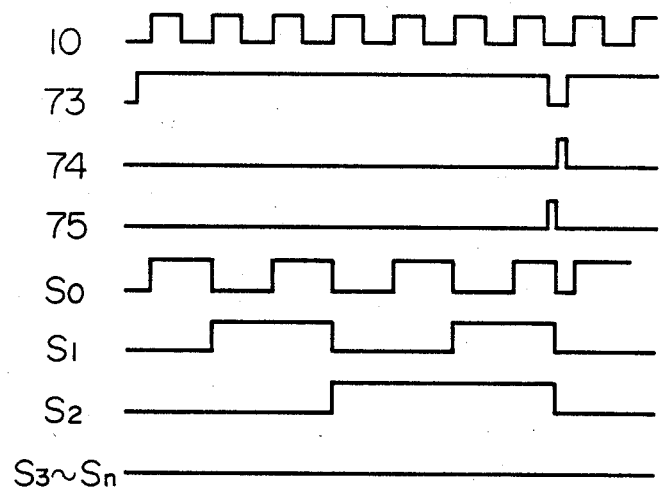
FIG. 9 is a timing chart showing the operation of the circuit shown in FIG. 8.

FIG. 9 is a timing chart illustrating the operation of the circuit 7. The counter 71 counts the clock pulses of the rotation signal 10 applied to its clock input terminal, and the counter output signal So to Sn is applied to the latch circuit 72. In response to the application of the stroke signal 75, the count of the counter 71 represented by So to Sn is latched by the latch circuit 72. At the next moment, the counter 71 is reset by the reset signal 74 to be ready for the next counting operation. Therefore, the counter 71 counts the number of pulses of the rotation signal 10 applied between two consecutive strobe signals 75 so that the speed signal 13 indicative of the value proportional to the rotation speed of the motor 2 appears from the circuit 7.

Figure 10:
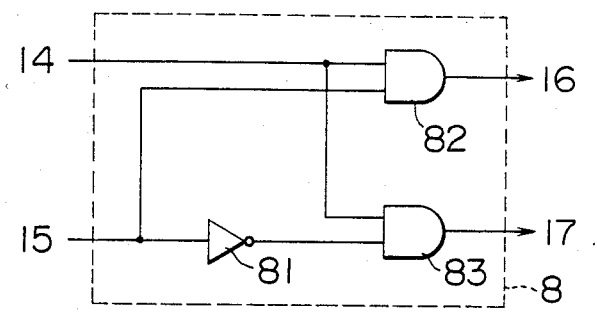
FIG. 10 is a circuit diagram showing the structure of the driver circuit shown in FIG. 3.
Figure 11:
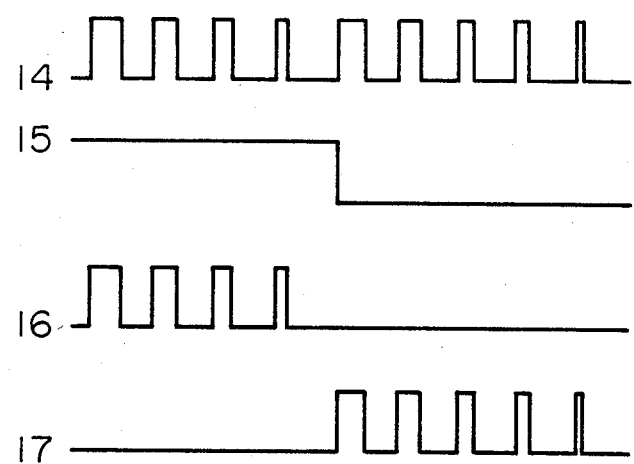
FIG. 11 is a timing chart showing the operation of the circuit shown in FIG. 10.

One form of the driver circuit 8 includes an inverter gate 81 and a pair of AND gates 82, 83 as shown in FIG. 10. The duty signal 14 is applied as one input to each of the AND gates 82 and 83. The normal-reverse rotation signal 15 is applied as the other input to the AND gate 82 directly and as the other input to the AND gate 83 through the inverter gate 81. Thus, when the duty signal 14 and normal-reverse rotation signal 15 having waveforms as shown in FIG. 11 are applied to the circuit 8, the duty signal 14 appears at the output of the AND gate 82 only when the normal reverse rotation signal 15 is in its high level, to provide the normal rotation output signal 16. On the other hand, the duty signal 14 appears at the output of the AND gate 83 only when the normal-reverse rotation signal 15 is in its low level, to provide the reverse rotation output signal 17.

Figure 12:
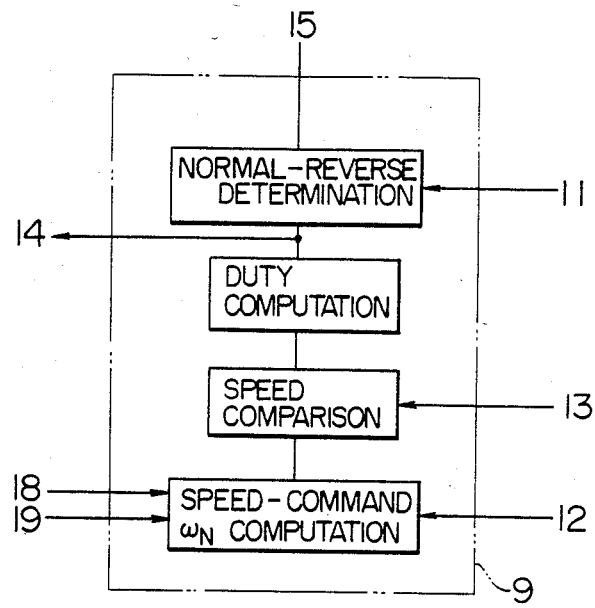
FIG. 12 is a function block diagram of the microcomputer circuit shown in FIG. 3.

The microcomputer circuit 9 (abbreviated hereinafter as an MC) includes a central processor unit (a CPU), a RAM, a ROM and an input-output (I/O) circuit and operates according to a program stored in the ROM. FIG. 12 is a block representation of the operating functions of the MC 9.

In response to the application of the stop position command signal 18 and the maximum speed setting command signal 19 from the external circuit (not shown) through the I/O circuit, the CPU in the MC 9 computes a speed command value $\omega_N$ corresponding to the difference between the desired angular position of the motor 2 commanded by the stop position command signal 18 and the present angular position determined by integration of the movement signal 12. When the difference between the value of the present speed indicated by the speed signal 13 and the value of the speed command $\omega_N$ or the speed command $\omega_N$ itself is larger than the value of the maximum speed setting $\omega_1$ commanded by the maximum speed setting command signal 19, the CPU computes the duty factor $D_t$ corresponding to the difference between the detected present speed and the maximum speed setting to generate the duty signal 14 indicative of the computed duty factor. Further, in response to the application of the rotating direction signal 11, the CPU determines the direction of rotation of the motor 2 on the basis of information including the desired angular position information and present angular position information to generate the normal-reverse rotation signal 15 indicative of the determined rotating direction.

Figure 13:
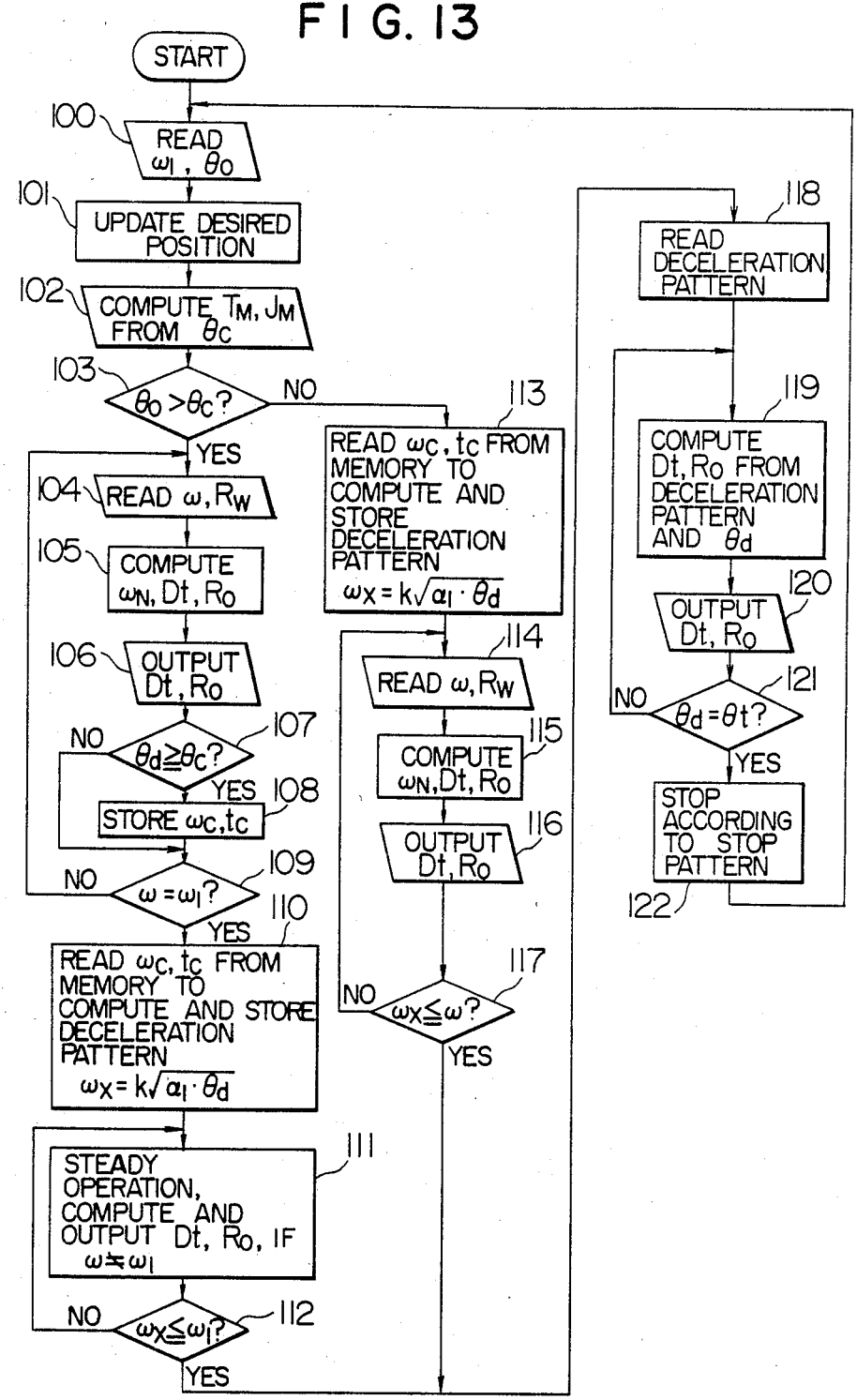
FIG. 13 is a flow chart of the operation of the microcomputer circuit shown in FIG. 12.

FIG. 13 is a flow chart of the operation of the MC 9. As soon as the program starts, the maximum speed setting $\omega_1$ and the stop position command $\theta_o$ provided by the respective command signals 19 and 18 (FIG. 3) applied from the external circuit (not shown) are read in step 100. The stop position command $\theta_o$ indicates the stop position of the motor 2 measured from the error-free present angular position which is taken as the reference position, that is, it indicates the amount of angular movement of the motor 2 from the error-free present angular position. In step 101, the value of the stop position command $\theta_o$ is added to the value of the error-free present angular position represented by the endless-making code and position code described already with reference to FIG. 1 and stored in the RAM of MC 9, to update the value of the desired angular position to which the motor 2 is to be moved. The endless-making code is composed of 3 bits as described already. When the endless-making code attains a value "111" as a result of a carry, the MSB of this code is cleared, while, when this code attains a value "000" as a result of a borrow, the MSB of the code is set as also described already. This procedure will be described later again with reference to FIG. 14. Like the information of the desired angular position to which the motor 2 is to be moved, the information of the present angular position represented by the endless-making code and position code is also stored in the RAM, and this information is updated each time the movement signal 12 indicative of the amount of angular movement of the motor 2 is applied to the MC 9. As in the case of the desired angular position information, the MSB of the endless-making code of the present angular position information is cleared or set depending on generation of a carry or a borrow. In the case of computation of the amount of remaining angular movement $\theta_d$ which is the difference between the present angular position and the desired angular position of the motor 2, the MSB of the endless-making code is ignored when the MSB of the endless-making code is cleared or set in the course of computation. Such a manner of control is also done according to the program stored in the ROM.

In step 102, on the basis of the specified torque $T_M$ and inertia $J_M$ of the motor 2, the minimum amount of angular movement $\theta c$ for stoppage is computed. This $\theta c$ represents the amount required until the motor 2 is stopped after its rotation speed attains the externally-commanded maximum speed setting $\omega_1$ and is then decelerated. Generally, however, this $\theta c$ is frequently selected to be a constant. Although this minimum amount of angular movement $\theta c$ represents the value measured under the no-loaded condition, the value of $\theta c$ is substantially a minimum in an actual operation in which the motor 2 is loaded. Then, in step 103, this minimum amount of angular movement $\theta c$ for stoppage is compared with the value of the stop position command $\theta o$. When, $\theta o$ is less than or equal to $\theta c$, the motor 2 can not be decelerated with little hunting unless deceleration of the motor 2 is started before attainment of the maximum speed setting $\omega_1$. Therefore, in the case of $\theta o \leq \theta c$, that is, in the case of $\theta o \not> \theta c$, the procedure for acceleration is changed.

When the result of comparison in step 103 proves that $\theta o > \theta c$, the rotating direction $R_\omega$ and the rotation speed $\omega$ of the motor 2 are read in step 104 from the signals 11 and 13 described with reference to FIG. 3. Then, on the basis of the data of $R_\omega$ and $\omega$ thus obtained and, also, on the basis of the data of the present and desired angular positions updated by reading of the amount of angular movement $\theta$ from the signal 12, the values of the speed command $\omega_N$, duty factor Dt and normal-reverse rotation signal Ro are computed in step 105, and in step 106, the signals 14 and 15 (FIG. 3) indicative of the values of Dt and Ro thus computed are applied from the MC 9 to the driver circuit 8 shown in FIG. 3. Reading of $\theta$ is not shown in the flow chart of FIG. 13 since $\theta$ is continuously detected.

Then, in step 107, judgment is made as to whether or not the amount of remaining angular movement $\theta d$, which is the difference between the present angular position and the desired angular position of the motor 2, becomes equal to the amount reference angular movement $\theta c$ (corresponding to the deceleration starting position) for the purpose of measurement of the deceleration characteristic. When the result of judgment in step 107 is "NO", step 109 is followed. On the other hand, when the result of judgment in step 108 is "YES", 20 the value $\omega_c$ of the speed signal $\omega$ detected at that time and the value of the period of time tc are stored in the RAM in step 108, and step 109 is followed. The data of $\omega_c$ and tc are used later for the computation of the acceleration $\alpha_1 = \omega_c/t_c$. In step 109, the value of the speed signal $\omega$ is compared with the maximum speed setting $\omega_1$. When the result of comparison in step 109 proved that $\omega \neq \omega_1$, the program returns to the step 104 in which the detection of the speed $\omega$ and rotating direction $R_\omega$ is repeated. On the other hand, when the result of comparison in step 109 proves that $\omega = \omega_1$, the data of $\omega_c$ and $t_c$ stored in step 108 are read out from the RAM in step 110 to compute the acceleration $\alpha_1 = \omega_c/t_c$, and, then, the amount of remaining angular movement $\theta d$ is used to compute the value of the estimated speed $\omega_x = K\sqrt{\alpha_1 \cdot \theta d}$ determining the deceleration pattern and to store it in the RAM. The step 110 completes the acceleration of the motor 2 and is followed by step 111 in which the motor 2 is placed in its steady operation mode. In step 111, the value of the speed signal $\omega$ is compared with the value of the maximum speed setting $\omega_1$. When the result of comparison in step 111 proves that $\omega \neq \omega_1$, the values of the duty factor Dt and normal-reverse rotation signal Ro are computed again, and the signals 14 and 15 indicative of the computed values of Dt and Ro are generated for the control of the steady operation of the motor 2.

Then, in step 112, judgment is made as to whether or not the estimated speed $\omega_x$ corresponding to the amount of remaining angular movement $\theta d$ has dropped to the maximum speed setting $\omega_1$. When the result of judgment in step 112 proves that $\omega_x > \omega_1$, the steady operation mode is continued at the maximum speed setting $\omega_1$. When the relation $\omega_x \leq \omega_1$ is now established, the motor 2 is placed in the deceleration mode.

If the result of judgment in step 103 proves that $\theta o \leq \theta c$, that is, $\theta o \not> \theta c$, the deceleration pattern $\omega_x = K\sqrt{\alpha_1 \cdot \theta d}$ is computed on the basis of the previous values of $\omega_c$ and $t_c$ and is stored in the RAM in step 113. Then in step 114, the values of the speed signal $\omega$ and rotating direction $R_\omega$ are read, and, in step 115, the values of the speed command $\omega_N$, duty factor Dt and normal-reverse rotation signal Ro are computed on the basis of the data of $\omega$ and $R_\omega$ and, also, on the basis of the amount of remaining angular movement $\theta d$. Then, in step 116, the signals 14 and 15 indicative of the computed values of Dt and Ro are generated for the control of the acceleration mode. Then, in step 117, the value of the estimated speed $\omega_x$ is compared with the value of the detected rotation speed $\omega$ of the motor 2. When the result of comparison in step 117 proves that $\omega_x > \omega$, the control of the acceleration mode is continued, while, when the result proves that $\omega_x \leq \omega$, the motor 2 is placed in the deceleration mode.

For the purpose of the control of the deceleration mode, the deceleration pattern stored in the RAM in step 110 or 113 is read out from the RAM in step 118, and, in order to set the speed $\omega$ of the motor 2 at the estimated speed $\omega_x$ corresponding to the amount of remaining angular movement $\theta d$, the values of the duty factor Dt and normal-reverse rotation signal Ro are computed in step 119. The signals 14 and 15 indicative of the computed values of Dt and Ro are then generated in step 120. Then, in step 121, judgment is made as to whether or not the amount of remaining angular movement $\theta d$ has attained the value $\theta t$ sufficient for stopping the motor 2. When the result of judgment in step 121 proves that $\theta d \neq \theta t$, the program returns to the step 119 to repeat the deceleration procedure, while, when the result proves that $\theta d = \theta t$, the motor stopping routine is run in step 122 to stop the motor 2 according to the stopping pattern.

In the manner above described, the optimum deceleration pattern in the deceleration mode is computed on the basis of the data detected in the acceleration mode thereby controlling the power supplied to the motor 2. Thus, the optimized deceleration control can be always attained to ensure smooth positioning control of the motor 2 regardless of replacement of the motor and/or the load or regardless of variations of the motor torque and/or the load torque due to variations of the ambient temperature. Further, even when some of the data required to compute the optimum deceleration pattern can not be obtained in the acceleration mode due to the insufficiency of the commanded angular movement, the optimum deceleration pattern can still be computed on the basis of previously stored data, so that the desired positioning control of the motor 2 can be equally effectively achieved.

Figure 14:
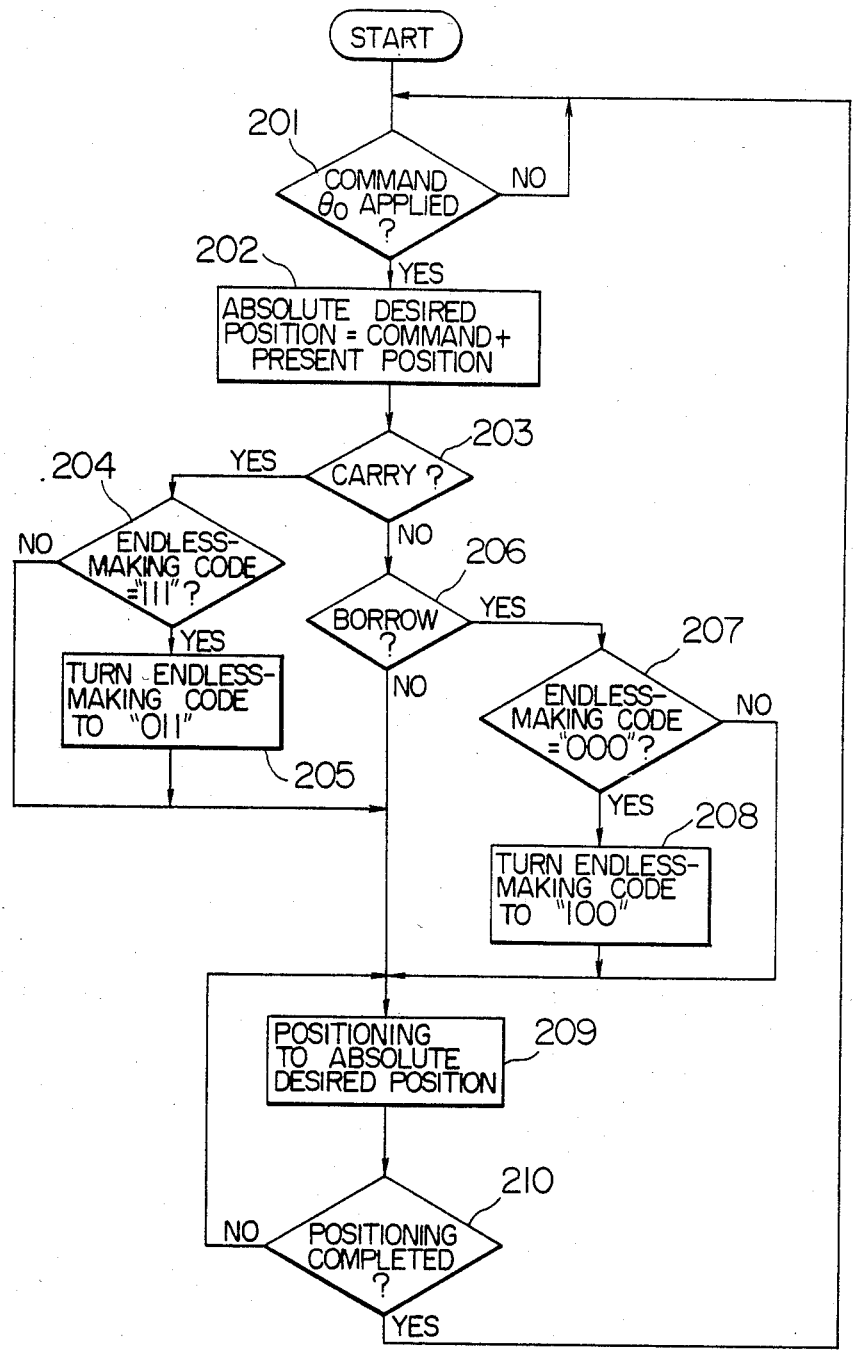
FIG. 14 is a flow chart of part of the operation pertaining to an embodiment of the endless counting method according to the present invention in the flow chart shown in FIG. 13.

FIG. 14 is a flow chart in which the manner of processing for the positioning control of the motor 2 described with reference to FIG. 13 is combined with the program routine in which the data of the desired angular position stored in the RAM is updated depending on the stop position command $\theta o$.

As soon as the program starts, inputting of the stop positioned command $\theta_o$ is switched at step 201. When the stop position command $\theta_o$ is read in step 100 of the flow chart shown in FIG. 13, the presence or absence of the command $\theta_o$ is detected in step 201. When the presence of the stop position command $\theta_o$ is detected in step 201, step 202 is followed. In step 202, the value of $\theta_o$ is added to the value of the error-free present angular position to compute a new absolute desired angular position. Then, in step 203, judgment is made as to whether or not a carry has occurred in the course of computation in step 202. When the result of judgment in step 203 is "YES", whether or not the endless-making code has attained the value "111" is checked in step 204. When the result of checking in step 204 proves that the endless-making code is now "111", the MSB of this code is cleared to turn the code into "011" in step 205. On the other hand, when the result of checking in step 204 proves that the endless-making code is not "111", the MSB of this code is not changed, and step 209 is followed.

When, on the other hand, the result of judgment in step 203 proves that a carry has not occurred, judgment is made in step 206 as to whether or not a borrow has occurred. When the judgment in step 206 proves that a borrow has occurred, judgment is made in step 207 as to whether or not the endless-making code is now "000". When the result of judgment in step 207 proves that the endless-making code is "000", the MSB of this code is set to turn it into "100" in step 208. On the other hand, when the result of judgment in step 207 proves that the endless-making code is not "000", the MSB of this code is not changed, and step 209 is followed. When the result of judgment in step 206 proves that there is no borrow, step 209 is also followed. Steps 209 and 210 in FIG. 14 are block representations of the steps of processing executed after the step 102 in FIG. 13. Therefore, in step 209, the positioning control for bringing the motor 2 to the absolute desired angular position is carried out, and, in step 210, whether or not the positioning control has been completed is judged. Upon decision of the completion of the positioning control, the program routine returns to the step 201 to be ready for waiting an input of the next stop position command $\theta_o$.

The data of the actual present angular position of the motor 2 stored in the RAM is sequentially updated in step 209 in a manner similar to that described already with reference to the updating of the data of the desired angular position of the motor 2.

By virtue of the manner of processing described above, neither overflow nor underflow occurs in the endless-making code so that the absolute angular position of the motor 2 can be expressed within the range required for the control purpose.

Although the aforementioned embodiment of the present invention has been described with reference to its application to the positioning control of a motor by way of example, it is apparent that the present invention is widely universally applicable to various methods of endless counting by merely employing a position memory storing the data indicative of the present position of a movable body.

Another embodiment of the endless counting method according to the present invention will be described with reference to FIG. 15 together with another embodiment of the endless counting apparatus suitable for the practice of the method.

Figure 15:
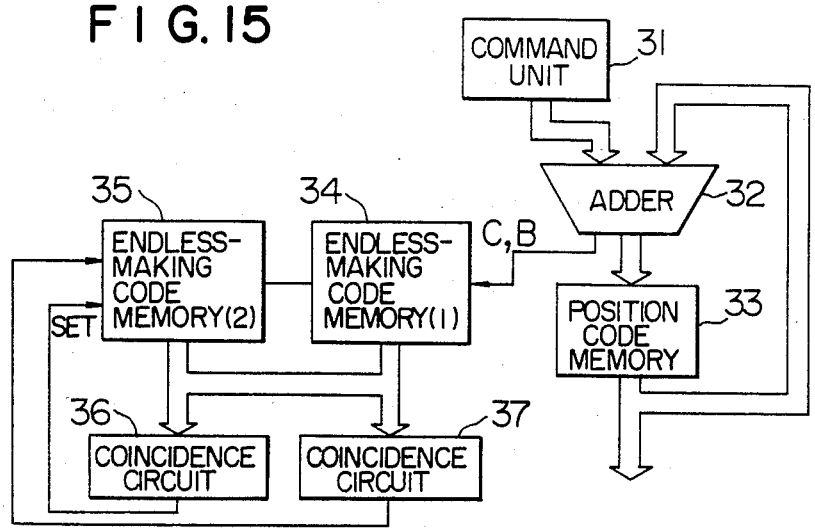
FIG. 15 is a block diagram showing the structure of an embodiment of the endless counting apparatus according to the present invention.

FIG. 15 is a block diagram showing the structure of such an embodiment of the endless counting apparatus according to the present invention. This embodiment is also directed to the positioning control of, for example, a motor similar to that described already.

Referring to FIG. 15, the apparatus includes a stop position command unit 31, an adder 32, a position code memory 33, a first endless-making code memory 34 for storing an endless-making code except its MSB, a second endless-making code memory 35 for storing the MSB of the endless-making code, and a pair of coincidence circuits 36 and 37. The number of bits of the endless-making code stored in the first and second endless-making code memories 34 and 35 is selected to be 3 in the present embodiment. However, the number of bits of this code is generally expressed by n, and the two memories 34 and 35 are illustrated for conveniences of explanation. The three memories 33, 34 and 35 may be included in a single memory by bit division of a word.

In the apparatus having the structure shown in FIG. 15, a stop position command is applied from the command unit 31 to the adder 32 which adds the value of the stop position command to the value of the motor's present angular position stored in the position code memory 33. When a carry C or a borrow B occurs as a result of addition, a "1" is incremented to or decremented from the endless-making code stored in the endless-making code memories 34 and 35. The coincidence circuits 36 and 37 judge as to whether or not the result of addition has attained a predetermined value, and the MSB of the endless-making code is cleared or set when the endless-making code is judged to attain the predetermined value. An adder for incrementing or decrementing the endless-making code in response to the occurrence of a carry C or a borrow B from the adder 32 is not shown for the sake of simplicity of illustration. When the value of the stop position command applied from the command unit 31 is negative, the adder 32 adds the negative value or makes a subtraction.

In the case of the processing for the positioning control of the motor according to the flow charts shown in FIGS. 13 and 14, the control circuit shown in FIG. 3 includes the MC 9 which controls the operation of the control circuit. In contrast, in the second embodiment, the MC 9 in the structure shown in FIG. 3 is replaced by a hardware control circuit in which a circuit as shown in FIG. 15 is incorporated so as to achieve the positioning control of the motor in a manner similar to that described with reference to FIGS. 13 and 14.

The positioning control with the structure shown in FIG. 15 will now be described.

As described above, the command unit 31 shown in FIG. 15 applies its stop position command as one input to the adder 32.

On the other hand, the value of the present angular position of the motor is stored in the form of absolute angular position information in the position code memory 33, and the output of the position code memory 33 is applied as the other input to the adder 32. The adder 32 adds the value of the stop position command to the value of the present angular position of the motor, and the value representing the result of addition is then preset in the position code memory 33. When a carry C or a borrow B occurs as a result of addition by the adder 32, this fact is reflected in the first and second endless-making code memories 34 and 35.

The coincidence circuits 36 and 37 include constant circuits storing constants "000" and "111" and comparison circuits comparing the contents of the first and second endless-making code memories 34 and 35 with the constants respectively, so that the MSB of the endless-making code is cleared or set when the endless-making code coincides with "111" or "000". Although the number of bits of the endless-making code is selected to be 3 in the present embodiment, this endless-making code is generally an n-bit code. In such a case, the constant circuits and comparison circuits are n-bit circuits, and the constant circuits store predetermined codes selected for clearing or setting the MSB of the endless-making code.

The stop position command commanding the value of the amount of movement of the motor is applied from the command unit 31 to the adder 32 to be added to the data indicative of the motor's present angular position applied from the position code memory 33, and the result of addition by the adder 32 is then preset in the position code memory 33.

When a carry C or a borrow B occurs in the course of addition by the adder 32, this fact is reflected in the contents of the first and second endless-making code memories 34 and 35. That is, in response to the occurrence of a carry C, the endless-making code is incremented, while, in response to the occurrence of a borrow B, the endless-making code is decremented.

When the endless-making code is turned into "111" as a result of incrementing, the above fact is detected by the coincidence circuit 37 as described already, and the MSB of the endless-making code is cleared to turn the code into "011". On the other hand, when the endless-making code is turned into "000" as a result of decrementing, the above fact is detected by the coincidence circuit 36 as described already, and the MSB of the endless-making code is set to turn the code into "100".

In the manner above described, the endless-making code is changed cyclically without causing an overflow or an underflow so that the movement of the motor by an abnormal amount due to an overflow or an underflow would not occur in spite of repeated application of the stop position command from the command unit 31.

The data of the actual present position of the moving body can be updated in a manner similar to that described above, with reference to the updating of the desired position, by using the structure shown in FIG. 15.

Thus, as in the case of the first embodiment, the present invention is widely universally applicable to various endless counting apparatus suitable for the practice of various methods of endless counting by merely employing a position code memory 33 storing the data indicative of the present position of a movable body.

What is claimed is:

1. A method for endless counting by an apparatus comprising a first memory for storing a code of a first predetermined number of bits sufficient to represent the maximum value of each coded input expressed according to binary notation, a second memory for storing an endless-making code of a second predetermined number of bits of higher order than and contiguous to the less and least significant bits stored in said first memory, and arithmetic means for adding or subtracting the value of the coded input to or from the contents of said first and second memories depending on the input value to be counted and applying the result of addition or subtraction to said first and second memories, said method comprising the steps of:

clearing the most significant bit of the endless-making code stored in said second memory when the code stored in said second memory has attained a value which will cause an overflow in response to a carry from the contents of said first memory during an adding operation by said arithmetic means; and setting the most significant bit of the endless-making code stored in said second memory when the code stored in said second memory has attained a value which will cause an underflow in response to a borrow from the contents of said first memory during a subtracting operation by said arithmetic means.

2. An endless counting method as claimed in claim 1, wherein said first and second memories store information of the present position of a movable body to be subjected to positioning control, and said coded input is position information for moving the movable body from the present position to the desired position.

3. An endless counting method as claimed in claim 2, wherein said first and second memories are disposed in the same word region of a single memory by bit division.

4. An endless counting method as claimed in claim 1, wherein said first and second memories are disposed in the same word region of a single memory by bit division.

5. An endless counting method as claimed in claim 1, wherein the number of bits of said endless-making code is three or more.

6. An apparatus for endless counting by addition and subtraction of data comprising:

a first memory for storing a code of a first predetermined number of bits sufficient to represent the maximum value of each coded input expressed according to the binary notation;

a second memory for storing an endless-making code of a second predetermined number of bits of higher order than and contiguous to the less and least significant bits stored in said first memory;

computing means for adding or subtracting the value of the coded input to or from the contents of said first and second memories depending on the input value to be counted and generating the result of computation;

means for applying the result of computation generated from said computing means to said first and second memories;

first circuit means for cleaning the most significant bit of the endless-making code stored in said second memory when the code stored in said second memory has attained a value which will cause an overflow in response to a carry from the contents of said first memory during an adding operation by said computing means; and second circuit means for setting the most significant bit of the endless-making code stored in said second memory when the code stored in said second memory has attained a value which will cause an underflow in response to a borrow from the contents of said first memory during a subtraction operation by said computing means.

7. An endless counting apparatus as claimed in claim 6, wherein said first and second memories store information of the present position of a movable body to be subjected to positioning control, and said coded input is position information for moving the movable body from the present position to the desired position.

8. An endless counting apparatus as claimed in claim 7, wherein said first and second memories are disposed in a single memory by bit division of a word.

9. An endless counting apparatus as claimed in claim 6, wherein said first and second memories are disposed in a single memory by bit division of a word.

10. An endless counting apparatus as claimed in claim 6, wherein the number of bits of said endless-making code is three or more.

* * * * *